United States Patent [19]
Abend et al.

[11] Patent Number: 5,887,484
[45] Date of Patent: Mar. 30, 1999

[54] TRANSMISSION FOR SELF-PROPELLED WALKING LAWN MOWERS

[75] Inventors: Robert Abend, Morristown, Tenn.; Hirohiko Kawada, Amagasaki, Japan

[73] Assignee: Kanzaki Kokyukoki Mfg., Co., Ltd., Hyogo-ken, Japan

[21] Appl. No.: 819,076

[22] Filed: Mar. 18, 1997

[30] Foreign Application Priority Data

Mar. 18, 1996 [JP] Japan .................................. 8-060436

[51] Int. Cl.⁶ ................................................ A01D 69/00
[52] U.S. Cl. ........................ 74/424; 56/11.3; 56/11.8; 180/19.1
[58] Field of Search ..................... 56/11.3, 11.5, 56/11.8; 74/424, 606 R; 180/19.1

[56] References Cited

U.S. PATENT DOCUMENTS

| | | |
|---|---|---|
| 3,035,385 | 5/1962 | Lill . |
| 4,135,411 | 1/1979 | Alessio . |
| 4,896,487 | 1/1990 | Hikishima et al. ...................... 56/11.8 |
| 4,907,401 | 3/1990 | Nemoto, et al. ......................... 56/11.3 |
| 5,149,311 | 9/1992 | Luijten . |
| 5,505,101 | 4/1996 | Curtis . |
| 5,718,105 | 2/1998 | Irikura et al. ......................... 56/11.8 X |

FOREIGN PATENT DOCUMENTS

| | | |
|---|---|---|
| 64-37215 | 2/1989 | Japan . |
| 1-98953 | 7/1989 | Japan . |
| 3-28356 | 3/1991 | Japan . |
| 1 413 672 | 11/1975 | United Kingdom . |

Primary Examiner—Charles A Marmor
Assistant Examiner—David Fenstermacher
Attorney, Agent, or Firm—Knobbe, Martens Olson & Bear, LLP

[57] ABSTRACT

A transmission for self-propelled walking lawn mowers, comprising: a casing 17; an input shaft 5 vertically inserted into the casing 17; an output shaft 10 extending horizontally through the casing 17; a small gear 20 fixed on the input shaft 5; a large gear 21 meshing with the small gear; a supporting shaft fixedly sporting the large gear; and first and second intermediate gears 24 and 25 mounted on the supporting shaft and the output shaft 10, respectively, wherein the input shaft 5 is arranged on the side of the. large gear facing opposite to the supporting shaft and is supported by the top and bottom walls of the casing. Accordingly, it is possible to reduce the size of the casing for self-propelled walking lawn mowers, thereby making a lawn mower compact.

7 Claims, 7 Drawing Sheets

TRANSMISSION FOR SELF-PROPELLED WALKING LAWN MOWERS

TECHNICAL FIELD

The present invention relates to a transmission for transmitting rotation of an engine to wheels after the rotational speed having being reduced, and more particularly to a transmission for use in self-propelled walking lawn mowers.

BACKGROUND OF THE INVENTION

Figure 6:
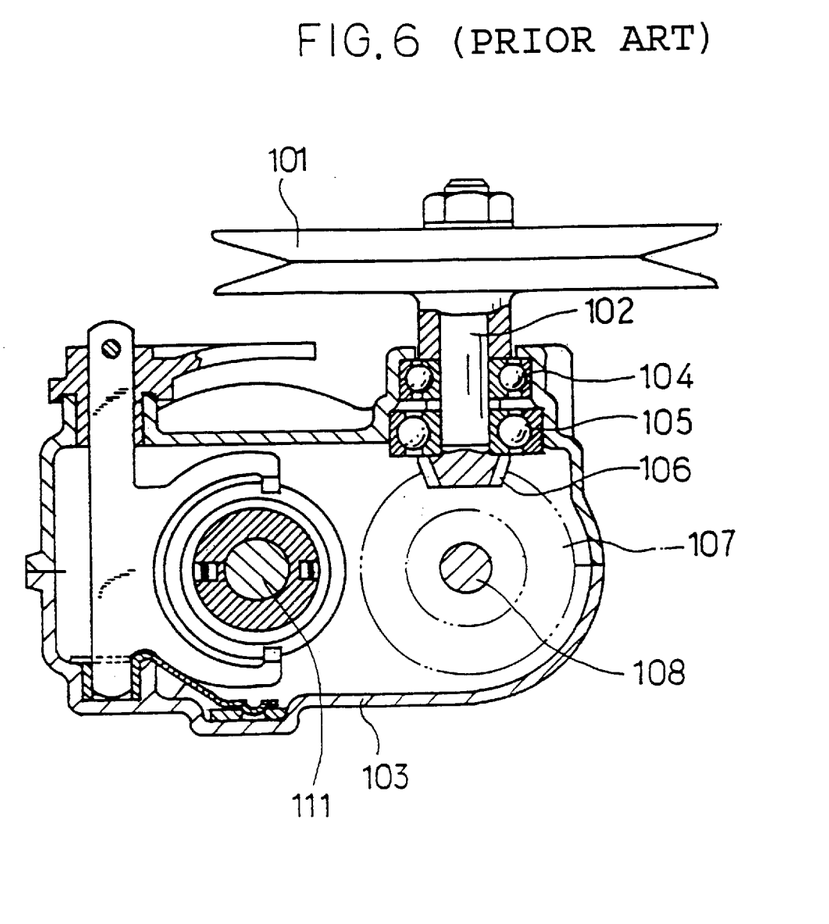
FIG. 6 is a vertical cross section showing a part of the internal structure of a prior art transmission.
Figure 7:
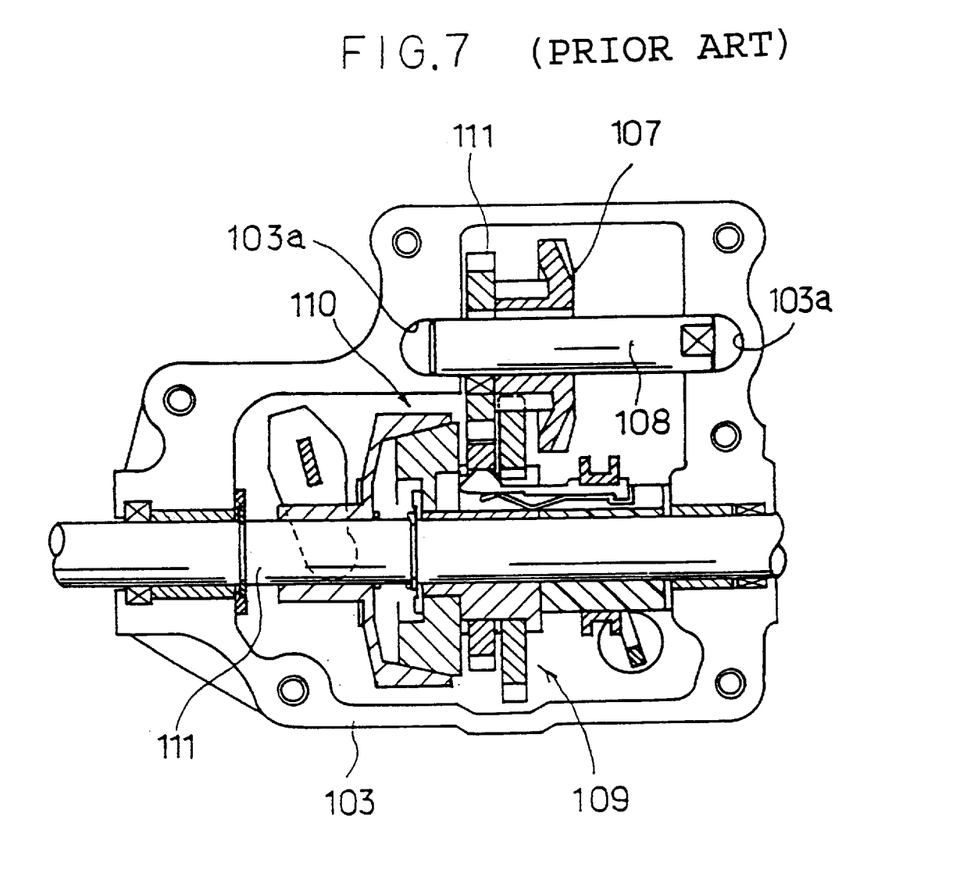
FIG. 7 is a horizontal cross section of the transmission of FIG. 6.

One example of this kind of conventional transmission is disclosed in, for example, Japanese Unexamined Utility Model Publication No. 98953/1989. In this transmission, drive power is transmitted from an engine (not shown) to an input shaft 102 via a belt pulley 101 as shown in FIGS. 6 and 7. The input shaft 102 is supported by two superimposed bearings 104 and 105 in the upper portion of the casing 103. A small gear 106 attached at the lower end of the input shaft 102 meshes with a large gear 107. The ends of a supporting shaft 108 supporting the large gear 107 are fitted in and supported by a pair of recesses 103a, 103a that are formed in the casing 103. Drive power is transmitted from the supporting shaft 108 to an output shaft 111 via a speed change gear mechanism 109 and a clutch 110 after the rotational speed having been changed.

However, the above prior art transmission is too bulky with the two bearings being superimposed to stably support the input shaft. Therefore, the belt pulley, which is attached at the end of the input shaft to transmit drive power from the engine, is located distant from the ground. Thus, the prior art transmission could not address the need for a compact walking lawn mower.

In order to solve the above problem, it is an object of the present invention to provide a transmission wherein the distance between the belt pulley and the ground is reduced by reducing the height dimension of the transmission, thereby making a lawn mower compact.

SUMMARY OF THE INVENTION

In order to solve the above problem, the transmission for self-propelled walking lawn mowers, comprising:

a casing;

an input shaft vertically inserted into the casing through an opening formed in a wall of the casing;

an output shaft passing through the casing and extending horizontally;

a small gear fixedly mounted on the input shaft;

a large gear meshing with the small gear;

a supporting shaft fixedly carrying the large gear at one end thereof and extending substantially in parallel to the output shaft; and first and second intermediate gears mounted on the supporting shaft and the output shaft, respectively, and meshing with each other for power transmission, wherein the input shaft is arranged on the side of the large gear facing opposite to the supporting shaft and is supported by the top and bottom walls of the casing.

Preferably, a clutch is arranged between the output shaft and the second intermediate gear.

Preferably, the clutch comprises an power input part connected to the second intermediate gear and a power receiving part connected to the output shaft.

Preferably, the supporting member is enclosed in and rotatably supported by a holder formed by the peripheral portion of the casing having a generally cylindrical shape.

Preferably, the small gear engages the large gear fixedly attached at one end of the supporting shaft and the end face of the large gear bears against an internal portion of the casing so that the supporting shaft is prevented from moving axially by the small gear and the internal portion.

DETAILED DESCRIPTION OF THE PREFERRED EMBODIMENTS

The embodiment of the transmission of the present invention will be described below with reference to the attached drawings.

Figure 1:
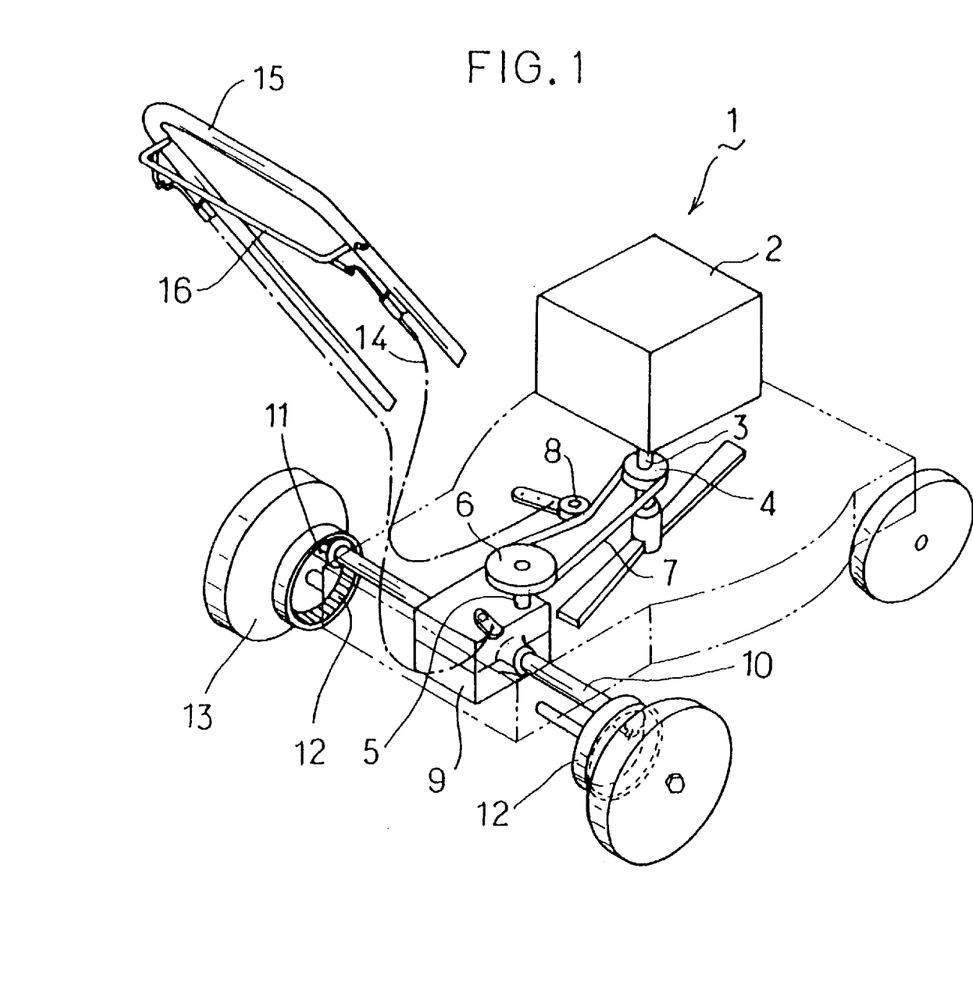
FIG. 1 is a perspective view schematically showing the internal structure of a self-propelled walking lawn mower.

FIG. 1 is a perspective view schematically showing the internal structure of a self-propelled walking lawn mower 1. A pulley 4 is fixedly mounted on a drive shaft 3 that projects downwardly from a drive unit 2 comprising an engine, etc. A pulley 6 is fixedly mounted on an input shaft 5. A belt 7 is passed through the pulleys 4 and 6. The belt 7 is maintained taut by a tension roller 8. The input shaft 5 is vertically inserted into a transmission 9 from above. The rotational force of a horizontally extending output shaft 10 is transmitted to mower wheels 13 via gears 11 and 12. Pivotally attached to a handle 15 of the lawn mower 1 is an operating arm 16 to which a clutch cable 14 is connected.

Figure 2:
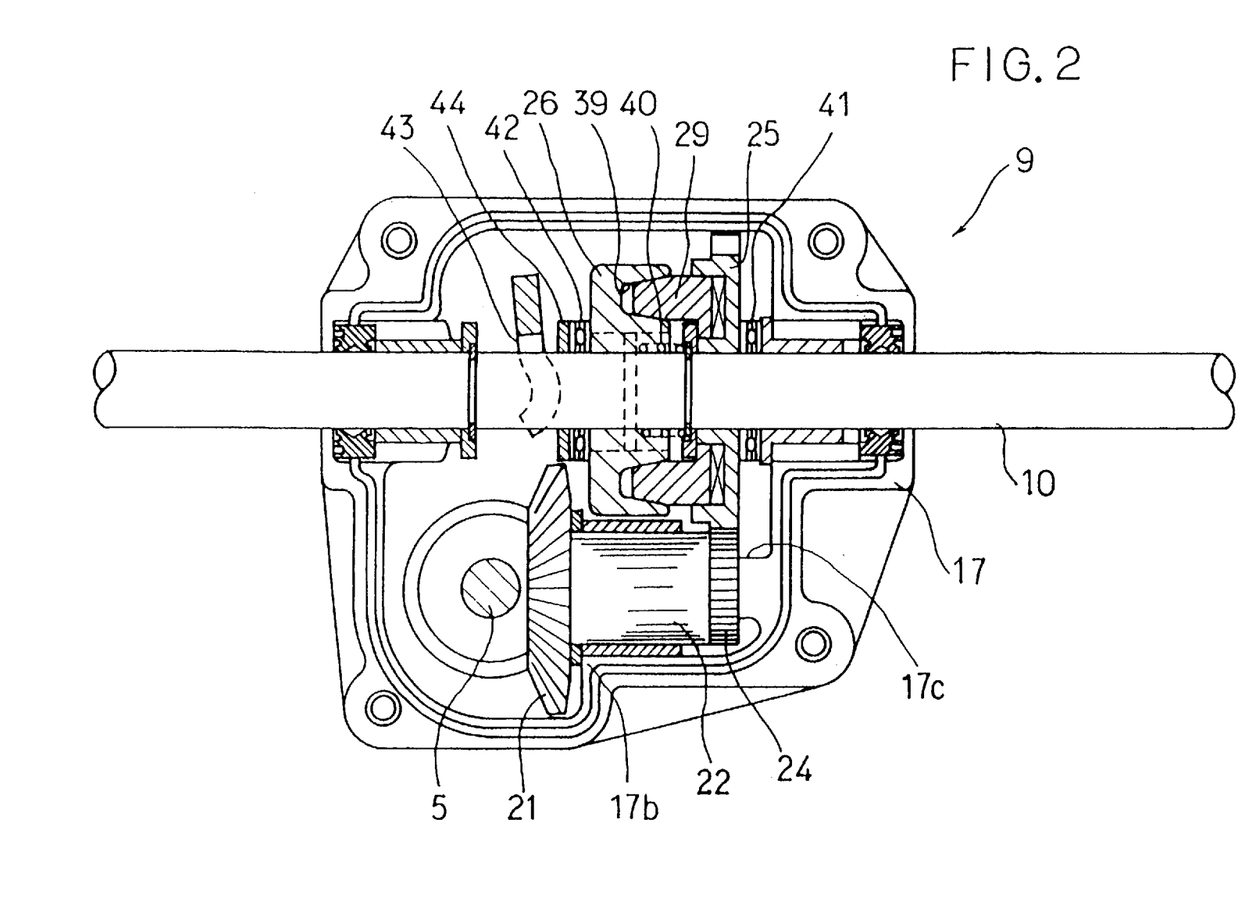
FIG. 2 is a horizontal cross section schematically showing the internal structure of one embodiment of the transmission of the present invention.
Figure 3:
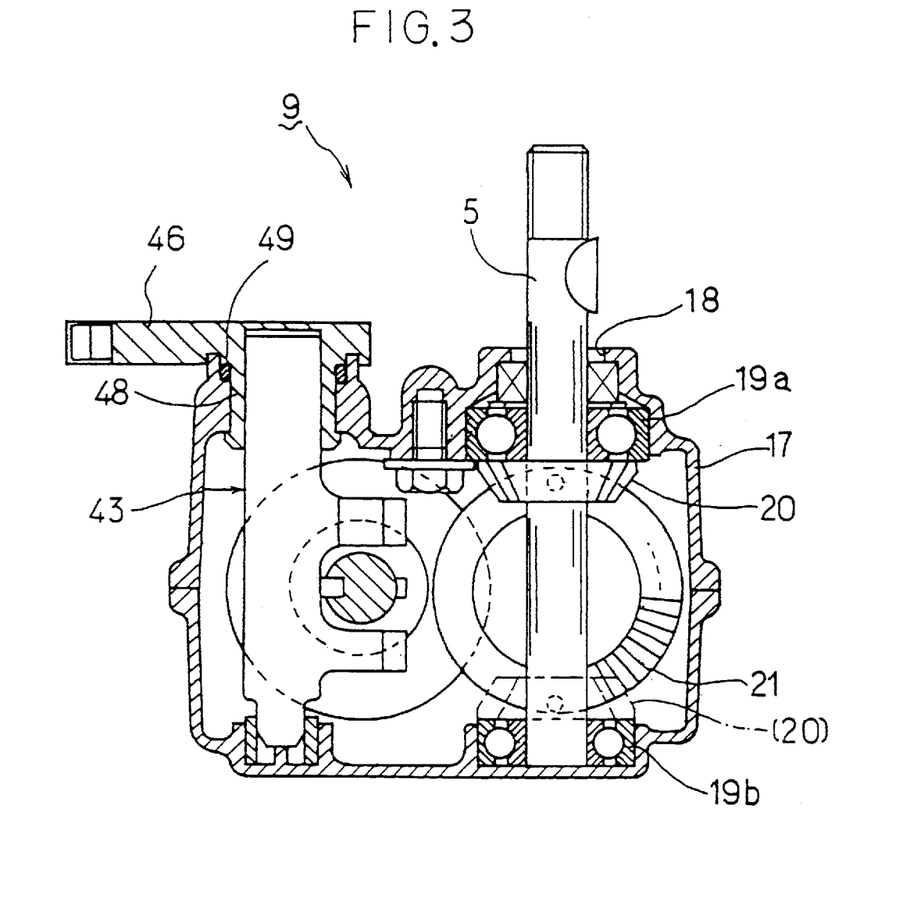
FIG. 3 is a vertical cross section of the transmission of FIG. 2.

FIGS. 2 and 3 are a horizontal and a vertical cross sections, both showing the internal structure of the transmission 9. Mounted below an upper opening 18 of the casing 17 and also on the inner bottom wall of the casing 17 are bearings 19a and 19b for supporting the input shaft 5. A small gear 20 is fixedly mounted on the input shaft 5 and located directly below the upper opening 18 of the casing 17. A large gear 21 meshing with the small gear 20 is supportedly attached at one end of a supporting shaft 22. The supporting shaft 22 extends in the direction opposite to the input shaft side of the large gear 21. The small gear 20 may also be mounted on the inner bottom wall of the casing 17 as indicated by an alternate long and short dash line in FIG. 3. In this case, the rotational direction of the output shaft 10 is in reverse to that in the case where the small gear 20 is mounted to the upper casing portion. The bearings 19a and 19b may preferably be ball bearings, but roller bearings or slide bearings may also be used.

Figure 4:
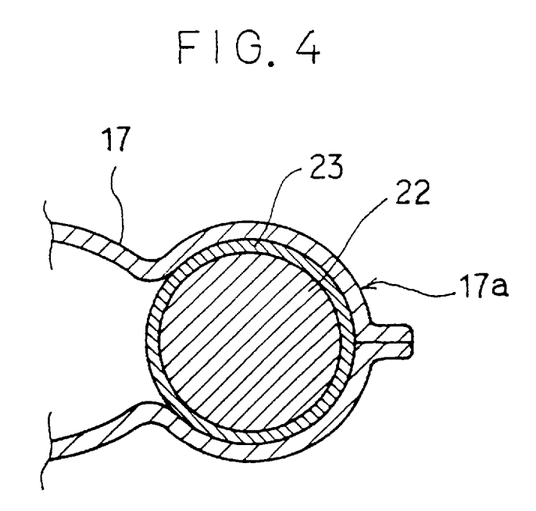
FIG. 4 is a vertical cross section showing a part of the casing of the transmission of FIG. 2.

As shown in FIG. 4, the supporting shaft 22 for the large gear 21 is supported by a holder 17a and a collar 23 fitted in the holder 17a, the holder 17a being formed by peripheral portions of the upper and lower casing halves each having a generally half-cylindrical shape. The collar 23 and the holder 17a are set to have enough length and thickness to stably support the supporting shaft 22. Attached at the opposite end of the supporting shaft 22 to the large gear 21 is a first intermediate gear 24 for transmitting drive power to the later-described clutch.

To prevent the supporting shaft 22 from moving. towards the input shaft 5, face gears, bevel gears, hypoid gears or like gears are used as the large gear 21 and the small gear 20. To prevent the supporting shaft 22 from moving in the direction opposite to the input shaft 5, the casing is integrally provided with a contact portion 17b contacting the large gear 21 and/or an extension 17c bearing against the first intermediate gear 24.

Figure 5:
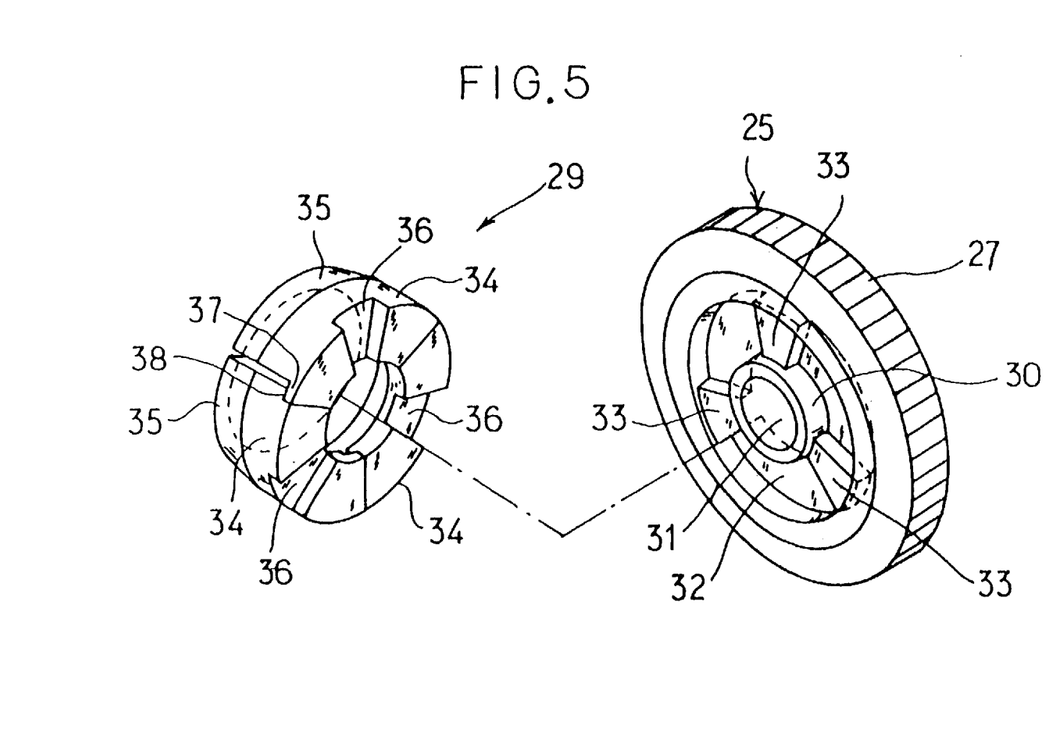
FIG. 5 is a perspective view showing the components of the clutch for the transmission of FIG. 2.

The first intermediate gear 24 meshes with a second intermediate gear 25 to drive the second intermediate gear 25. The second intermediate gear 25 is a large-diameter spur gear having teeth 27 and rotatably mounted on the output shaft 10. As shown in FIG. 5, a friction member 29 is fitted in one side of the second intermediate gear 25. The second intermediate gear 25 has a boss 30 at its central portion. A hole 31 for receiving the output shaft 10 passes through the boss 30. An annular groove 32 is formed around the boss 30. Formed in the groove 32 are three radially extending raised portions.

The friction member 29 is constituted by three circumferentially arranged friction pieces 34 that form a ring as a whole. Each friction piece 34 is partially wedge-shaped in axial cross section to taper towards a slider 26 described below. The outer and inner tapering faces of the friction piece 34 form friction surfaces 35. The friction piece 34 has a recess 36 formed on the side opposite to the friction surface 35 to engage one of the raised portions 33 of the second intermediate gear 25. The friction pieces 34 are fitted in the groove 32 with a small radial play. The raised portions 33 engage the recesses 36 so that the friction member 29 is fixed to the second intermediate gear 25 so as not to move in a circumferential direction of the gear 25. Each friction piece 34 has a lug 37 at the end portion close to the second intermediate gear 25. The lug 37 projects in the direction opposite to a rotational direction of the friction member 29 and engages a correspondingly positioned complementary recess 38 formed in the rearward friction piece 34. With this construction, when the lug 37 of the friction piece 34 is forced to float off during rotation, the recess 38 formed in the rearward friction piece 34 presses down the lug 37, so that the friction piece 34 is prevented from partially floating off from the groove 32.

Mounted on the output shaft 10 is an axially slidable slider 26. The slider 26 is keyed to the output shaft 10 so as not to rotate relative to the output shaft 10. Formed on the side of the slider 26 facing towards the friction member 29 is a friction surface 39 formed by a generally V-shaped annular groove, the friction surface 39 being engageable with the friction surface 35 of the friction member 29.

Thus, a clutch having a power input part and a power receiving part is constituted, wherein the power input part of the transmission is formed by the second intermediate gear 25 and the friction member 29, and the power receiving part of the transmission is formed by the slider 26. This clutch is engaged or disengaged respectively by the engagement and disengagement between the friction surfaces 35 and 39. According to this clutch, both the inner and outer faces of the friction piece 34 form the friction surface 35, with which the generally V-shaped friction surface 39 engages, so that drive power can be transmitted stably and efficiently due to the large frictional engaging area. It is possible, therefore, to reduce the radii of the friction piece 34 and the slider 26 to thereby make the transmission light and compact.

Arranged between the second intermediate gear 25 and the slider 26 is a clutch spring 40 that forces these components away from each other. Further, fitted to the output shaft 10 are thrust bearings 41 and 42 that are located adjacent to and bear on the second intermediate gear 25 and the slider 26, respectively. The thrust bearings 41 and 42 are axially slidable relative to the output shaft 10.

Disposed on the side of the thrust bearing 42 facing opposite to the slider 26 is a fork 43 which makes the engagement and disengagement of the clutch by external operation. The one end of the fork 43 is supported by the casing 17, and the other end projects out of the casing 17. An operating rod 46 is attached to the projecting end of the fork 43. The operating rod 46 is connected to the operating arm 16 and the clutch cable 14 shown in FIG. 1. The fork 43 has two fingers between which the output shaft 10 extends. The fingers contact an intermediate member 44. The intermediate member 44 is rotatably mounted on the output shaft 10 and contacts the thrust bearing 42. Accordingly, when the operating arm 16 shown in FIG. 1 is grasped together with the handle 15, the clutch cable 14 tensions to rotate the operating rod 46 and therefore rotate the fork 43. Then, the slider 26 moves towards the second intermediate gear 25 against the spring force of the clutch spring 40. Thereby, the friction surfaces 35 and 39 engages each other to engage the clutch. By contrast, when the operating arm 16 is released to loose the clutch cable 14, the fork 43 is also released, so that the slider 26 is moved away from the second intermediate gear 25 by the spring force of the clutch spring 40 to thereby disengage the clutch.

In this instance, a boss 48 is attached integrally to the operating arm 46 so as to receive the top end of the fork 43, the upper end of the boss 48 being closed and the lower end being opened. The boss 48 is inserted into a receiving hole of the casing 17. A sealing ring 49 is fitted between the boss 48 and the casing wall. The lower end of the boss 48 spreads resiliently in the radial direction so as not to slip off from the fork 43.

The internal operation of the thus-constructed transmission 9 is described below. When the drive unit 2 is actuated, the input shaft 5 is rotated via the belt 7. The small gear 20 is rotated with the rotation of the input shaft 5. The rotational speed is reduced at the large gear 21. The first intermediate gear 24 coaxial with the large gear 21 is rotated, and then the second intermediate gear 25 meshing therewith is rotated after the rotational speed being further reduced.

By grasping the operating arm 16, the fork 43 is operated via the operating rod 46 to thereby move the slider 26 towards the second intermediate gear 25 against the spring force of the clutch spring 40, so that the slider 26 frictionally engages the friction member 29. Since the slider 26 and the intermediate gear 25 are supported by the thrust bearings 41 and 42, respectively, they can be readily rotated although pushed towards each other. When the slider 26 rotates, the output shaft 10 keyed therewith rotates. By the rotation of the output shaft, the wheels 13 rotate.

According to the transmission 9 employing the above construction, the supporting shaft 22 is supported by the casing 17, and the one end thereof is connected to the small gear 20 via the large gear 21, while the other end of the supporting shaft 22 bears on the projection 17c. Further, the supporting shaft 22 contacts the casing at 17b to prevent the supporting shaft 22 from moving axially.

Furthermore, since the input shaft 5 is arranged on the side of the large gear facing opposite to the supporting shaft 22, the input shaft 5 can extend to the bottom wall of the casing 17, and thus the input shaft 5 can be supported by the opening 18 formed in the top wall and the bearing 19b formed on the bottom wall. Therefore, the input shaft 5 can be supported without two bearings being superimposed at the shaft receiving portion as seen in conventional transmissions, so that the height dimension of the transmission can be reduced.

As described above, according to the transmission of the invention for self-propelled walking lawn mowers, the large gear to mesh with the small gear is supported at one end of the supporting shaft, the small gear being fixedly attached to the input shaft, and the input shaft is arranged on the side opposite to the large gear. Further, since the input shaft is supported by the top and bottom walls of the casing, the height dimension of the casing can be reduced, thereby making compact the transmission and the resulting lawn mower.

We claim:

1. A transmission for self-propelled walking mowers, comprising:
    a casing comprising a top wall with an opening, a bottom wall, and two side walls;
    an input shaft adapted to be connected to driving means, said input shaft vertically extending through the opening of the top wall, and being rotatably supported at the top and bottom walls;
    an output shaft adapted to be connected to propelling means, said output shaft passing through the side walls of the casing and extending horizontally;
    a small gear fixedly mounted on the input shaft;
    a large gear meshing with the small gear;
    a supporting shaft having an end where the large gear is fixed, said supporting shaft having a side section, said supporting shaft being supported at the side section and positioned substantially in parallel to the output shaft, wherein the supporting shaft is perpendicular to the input shaft, and the large gear is located between the supporting shaft and the input shaft; and
    first and second intermediate gears mounted on the supporting shaft and the output shaft, respectively, and meshing with each other for power transmission.

2. The transmission for self-propelled walking mowers according to claim 1, further comprising a clutch arranged between the output shaft and the second intermediate gear.

3. The transmission for self-propelled walking mowers according to claim 2, wherein the clutch comprises a power input part connected to the second intermediate gear, and a power receiving part connected to the output shaft, said power input part and said power receiving part being detachably fitted together to control transmission of driving power from the second intermediate gear to the output shaft.

4. The transmission for self-propelled walking mowers according to claim 3, wherein said power input part has a ring-shaped projection, and said power receiving part has a ring-shaped recess capable of fitting into said ring-shaped projection.

5. The transmission for self-propelled walking mowers according to claim 1, wherein said supporting shaft has another end and said first intermediate gear is fixed at said end.

6. A transmission for self-propelled walking mowers comprising:
    a casing comprising a top wall with an opening, a bottom wall, and two side walls;
    an input shaft adapted to be connected to driving means, said input shaft vertically extending through the opening of the top wall, and being rotatably supported at the top and bottom walls;
    an output shaft adapted to be connected to propelling means, said output shaft passing through the side walls of the casing and extending horizontally;
    a small gear fixedly mounted on the input shaft;
    a large gear meshing with the small gear;
    a supporting shaft having an end where the large gear is fixed, said supporting shaft having a side section, said supporting shaft being supported at the side section and positioned substantially in parallel to the output shaft, wherein the supporting shaft is perpendicular to the input shaft, and the large gear is located between the supporting shaft and the input shaft; and
    first and second intermediate gears mounted on the supporting shaft and the output shaft, respectively, and meshing with each other for power transmission,
    wherein said casing comprises a peripheral portion having a generally cylindrical shape, said peripheral portion forming a holder that encloses and rotatably supports the supporting shaft.

7. A transmission for self-propelled walking mowers comprising:
    a casing comprising a top wall with an opening, a bottom wall, and two side walls;
    an input shaft adapted to be connected to driving means, said input shaft vertically extending through the opening of the top wall, and being rotatably supported at the top and bottom walls;
    an output shaft adapted to be connected to propelling means, said output shaft passing through the side walls of the casing and extending horizontally;
    a small gear fixedly mounted on the input shaft;
    a large gear meshing with the small gear;
    a supporting shaft having an end where the large gear is fixed, said supporting shaft having a side section, said supporting shaft being supported at the side section and positioned substantially in parallel to the output shaft, wherein the supporting shaft is perpendicular to the input shaft, and the large gear is located between the supporting shaft and the input shaft; and
    first and second intermediate gears mounted on the supporting shaft and the output shaft, respectively, and meshing with each other for power transmission,
    wherein the supporting shaft has a neck where the large gear is fixed, and said casing comprises an internal portion against which a neck of the supporting shaft is movably supported to prevent the supporting shaft from moving axially.

* * * * *